United States Patent
Oku et al.

(10) Patent No.: US 8,572,259 B2
(45) Date of Patent: Oct. 29, 2013

(54) DATA COMMUNICATION TERMINAL, PROXY DEVICE, DATA COMMUNICATION SYSTEM, AND DATA COMMUNICATION METHOD

(75) Inventors: Makoto Oku, Tokyo (JP); Noriko Mizuguchi, Yokosuka (JP); Masayuki Tsuda, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 310 days.

(21) Appl. No.: 12/936,105

(22) PCT Filed: Apr. 1, 2009

(86) PCT No.: PCT/JP2009/056819
§ 371 (c)(1),
(2), (4) Date: Nov. 23, 2010

(87) PCT Pub. No.: WO2009/123264
PCT Pub. Date: Oct. 8, 2009

(65) Prior Publication Data
US 2011/0106955 A1    May 5, 2011

(30) Foreign Application Priority Data
Apr. 2, 2008 (JP) ............................... P2008-096294

(51) Int. Cl.
*H04L 12/66* (2006.01)
*G06F 15/16* (2006.01)

(52) U.S. Cl.
USPC ......................................... 709/227; 370/352

(58) Field of Classification Search
USPC ....................................................... 709/227
See application file for complete search history.

(56) References Cited

U.S. PATENT DOCUMENTS

2004/0028035 A1  2/2004  Read
2007/0180081 A1*  8/2007  Okmianski et al. ........... 709/223
2009/0172801 A1*  7/2009  Friedrich et al. ................ 726/12

FOREIGN PATENT DOCUMENTS

JP    2002 009846    1/2002
(Continued)

OTHER PUBLICATIONS

Office Action issued Mar. 30, 2010, in Japanese Patent Application No. 2008-096294, filed Apr. 2, 2008 (with English language translation).

(Continued)

*Primary Examiner* — Asad Nawaz
*Assistant Examiner* — Nicholas Jensen
(74) *Attorney, Agent, or Firm* — Oblon, Spivak, McClelland, Maier & Neustadt, L.L.P.

(57) ABSTRACT

A technique for easily realizing data communication without limiting the application layer protocol during data communication while maintaining the proxy function. A mobile communication terminal (2) includes a control protocol processing section (203) which transmits an address request to a proxy device (5) to acquire global address information using the HTTP that is preset so as to be used by the mobile communication terminal (2) and the proxy device (5), a TCP/UDP data transmitter/receiver section (205) which establishes a connection with the proxy device (5), and an application section (201) which transmits data via a communication path between the proxy device (5) and a server device (6) using the global address information as the transmitter address. The control protocol processing section (203) transmits information relating to the connection destination of the server device (6) to the proxy device (5) using the HTTP, and requests a connection between the proxy device (5) and the server device (6) using a predetermined transport layer protocol.

6 Claims, 14 Drawing Sheets

(56) References Cited

FOREIGN PATENT DOCUMENTS

| | | |
|---|---|---|
| JP | 2004 072291 | 3/2004 |
| JP | 2005 027098 | 1/2005 |
| JP | 3757399 | 3/2006 |
| JP | 2007 201688 | 8/2007 |
| JP | 2007 215090 | 8/2007 |
| JP | 2007 324788 | 12/2007 |

OTHER PUBLICATIONS

International Search Report issued May 19, 2009 in PCT/JP09/056819 filed Apr. 1, 2009.

International Preliminary Report on Patentability and Written Opinion issued Dec. 9, 2010, in PCT/JP2009/056819.

Chinese Office Action (with English translation) mailed on Jul. 9, 2013, in counterpart Chinese Appln No. 200980111784.2 (11 pages).

* cited by examiner

Fig.5

| MOBILE DEVICE | MOBILE DEVICE LOCAL IP ADDRESS | MOBILE DEVICE PORT | USED PROTOCOL | OWN NODE PORT ON THE MOBILE DEVICE SIDE | OWN NODE PORT ON THE SERVER SIDE | CONNECTION DESTINATION IP ADDRESS | CONNECTION DESTINATION PORT | CONNECTION ID | ASSIGNED GLOBAL IP ADDRESS |
|---|---|---|---|---|---|---|---|---|---|
| MOBILE DEVICE #1 | 10.XXX.XX.1 | 1100 | TCP | 15103 | 2004 | 100.XXX.XX.1 | 1096 | 25 | 15.XXX.XX.1 |
| | 10.XXX.XX.1 | 1200 | TCP | 15103 | 2005 | 100.XXX.XX.1 | 1097 | 26 | 15.XXX.XX.1 |
| | 10.XXX.XX.1 | 1300 | UDP | 15104 | 2006 | 90.XX.XXX.200 | 1567 | 28 | 15.XXX.XX.1 |
| ... | | | | | | | | | ... |
| MOBILE DEVICE #n | 10.XXX.XX.3 | 1280 | TCP | 15103 | 2584 | 100.XXX.XX.1 | 1096 | 30 | 15.XXX.XX.1 |
| | 10.XXX.XX.3 | 18504 | TCP | 15103 | 2585 | 92.X.XXX.20 | 6002 | 49 | 15.XXX.XX.1 |

| DESTINATION IP | DESTINATION PORT | SOURCE IP | SOURCE PORT | DATA PORTION |
|---|---|---|---|---|
| PROXY LOCAL IP | PROXY LOCAL PORT | MOBILE DEVICE LOCAL IP | MOBILE DEVICE LOCAL PORT | ... |

(b)

| DESTINATION IP | DESTINATION PORT | SOURCE IP | SOURCE PORT | DATA PORTION |
|---|---|---|---|---|
| SERVER GLOBAL IP | SERVER GLOBAL PORT | PROXY GLOBAL IP | PROXY GLOBAL PORT | ... |

*Fig.12*

| CLIENT | CLIENT IP ADDRESS | CLIENT PORT | ID | CONNECTION PARTNER ID |
|---|---|---|---|---|
| CLIENT#1 | 15.XXX.XX.1 | 2004 | 1 | 2 |
| CLIENT#2 | 15.XXX.XX.3 | 2584 | 2 | 1 |
| CLIENT#3 | 15.XXX.XX.1 | 3100 | 3 | |
| ⋮ | | | | |
| CLIENT#n | 118.XXX.XX.3 | 5990 | n | m |

DATA COMMUNICATION TERMINAL, PROXY DEVICE, DATA COMMUNICATION SYSTEM, AND DATA COMMUNICATION METHOD

TECHNICAL FIELD

The present invention relates to a data communication terminal, a proxy device, a data communication system, and a data communication method.

BACKGROUND ART

In data communication using the Internet, etc., when an internal network, such as a specific carrier's data communication network or a corporate intranet, is connected to the Internet, in order to ensure high-speed access and the safety of communication, a proxy server is conventionally used. For such a proxy server, an HTTP (Hypertext Transfer Protocol) proxy, an FTP (File Transfer Protocol) proxy, etc., where an application layer protocol usable between a terminal and its communication destination is limited are widely used.

On the other hand, a data communication device is known that implements data communication using a plurality of application layer protocols (see the following Patent Document 1). The data communication device has the function of allowing, when receiving a SIP (Session Initiation Protocol) message from a client that includes protocol information, the client to perform data communication by a corresponding protocol.

CITATION LIST

Patent Literature

Patent Document 1: Japanese Patent Application Laid-Open No. 2007-201688

SUMMARY OF INVENTION

Technical Problem

However, in the above-described conventional proxy device, there is a tendency that an application layer protocol usable by a terminal is limited, and accepting a plurality of application layer protocols requires replacement of the proxy device or an extensive addition of functions. Meanwhile, it is also considered that data communication is directly performed between a terminal and its communication destination without passing through the proxy device. However, since the proxy device also has the function of translation between a private address and a global address, inconveniences such as global address exhaustion may occur and a problem of deterioration in the safety of communication also occurs.

The present invention is made in view of such problems, and an object of the present invention is therefore to provide a data communication terminal, a proxy device, a data communication system, and a data communication method which are capable of easily implementing data communication where an application layer protocol used upon data communication is not limited, while a proxy function is maintained.

Solution to Problem

To solve the above-described problems, a data communication terminal of the present invention performs data communication with a communication destination device through a proxy device in a data communication network, using a predetermined transport layer protocol, and comprises: address getting means for transmitting an address request to the proxy device using an application layer protocol, to get global address information which is used when establishing a connection with the communication destination device by the predetermined transport layer protocol, the application layer protocol being set to be usable in advance between the proxy device and the data communication terminal; connection establishing means for establishing a connection with the proxy device by the predetermined transport layer protocol; connection requesting means for transmitting connection destination information of the communication destination device to the proxy device using the application layer protocol, to request for a connection by the predetermined transport layer protocol between the proxy device and the communication destination device; and data communication means for transmitting data over a communication channel connected by the connection establishing means and the connection requesting means, via a communication channel established by the connection establishing means, using the global address information as a source address in data of an application layer.

Alternatively, a proxy device of the present invention is set up in a data communication network and relays data communication between a data communication terminal and a communication destination device using a predetermined transport layer protocol, and comprises: address assigning means for receiving an address request using an application layer protocol from the data communication terminal, and assigning global address information to the data communication terminal and transmitting the global address information to the data communication terminal, the application layer protocol being set to be usable in advance between the data communication terminal and the proxy device and the global address information being used when establishing a connection with the communication destination device by the predetermined transport layer protocol; connection establishing means for receiving connection destination information of the communication destination device from the data communication terminal using the application layer protocol, and establishing a connection with the communication destination device by the predetermined transport layer protocol; and data transferring means for setting the global address information as a source and thereafter transferring data received from the data communication terminal on the predetermined transport layer protocol to the communication destination device, using a communication channel connected by the connection establishing means.

In addition, a data communication system of the present invention comprises the above-described data communication terminal and proxy device.

In addition, a data communication method of the present invention performs data communication from a data communication terminal to a communication destination device via a proxy device in a data communication network, using a predetermined transport layer protocol, and comprises: an address getting step of transmitting, by the data communication terminal, an address request to the proxy device using an application layer protocol, to get from the proxy device global address information which is used when establishing a connection with the communication destination device by the predetermined transport layer protocol, the application layer protocol being set to be usable in advance between the proxy device and the data communication terminal; a first connection establishing step of establishing, by the data communication terminal, a connection with the proxy device by the predetermined transport layer protocol; a second connection establishing step of receiving, by the proxy device, connection destination information of the communication destination device from the data communication terminal and establishing a connection with the communication destination device by the predetermined transport layer protocol; a data communication step of transmitting, by the data communication terminal, data over a communication channel connected in the first connection establishing step, via the proxy device using the global address information as a source address in data of an application layer; and a data transferring step of setting, by the proxy device, the global address information as a source and thereafter transferring the data received from the data communication terminal in the data communication step to the communication destination device, using a communication channel connected in the second connection establishing step.

According to such a data communication terminal, a proxy device, a data communication system, and a data communication method, the data communication terminal obtains global address information which is used when establishing a connection with an external network, from the proxy device using an application layer protocol made usable in advance such as HTTP, and the data communication terminal is connected to the proxy device by a predetermined transport layer protocol such as TCP (Transmission Control Protocol) or UDP (User Datagram Protocol). Note that the "proxy device" as referred to here is a device having a role in terminating, when transferring data between the data communication terminal and its communication destination, a transport layer with the data communication terminal and its communication destination. Then, the data communication terminal passes connection information of a communication destination device to the proxy device using the application layer protocol, and the proxy device and the communication destination device are connected by a predetermined transport layer protocol. Data transmitted from the data communication terminal to the proxy device is transmitted to the communication destination device via the proxy device such that the global address information assigned to the data communication terminal is set as a source. Thereby, even if an application layer protocol made usable in advance in a data communication network is limited, data transfer using any application layer protocol is easily implemented via the proxy device. Namely, unlike NAT (Network Address Translation) technology that performs transparent transfer of packets by simply translating an IP address and a port number into preset ones, since an application program on the data communication terminal side can obtain global address information which is assigned to the terminal in a network outside the proxy device, any application program can perform data communication on a predetermined transport layer protocol. Furthermore, since the existing proxy function is also maintained, global addresses can be conserved and the safety of communication can also be maintained.

Advantageous Effects of Invention

According to the present invention, data communication can be easily implemented where an application layer protocol used upon data communication is not limited, while a proxy function is maintained.

BRIEF DESCRIPTION OF DRAWINGS

FIG. 5 is a diagram showing a data configuration of a port management table in FIG. 4.

FIG. 6 is a diagram showing a schematic configuration of data at the transport layer protocol level which is transferred by a TCP/UDP data relaying section in FIG. 4.

FIG. 12 is a diagram showing a data configuration of a matching address management table in FIG. 11.

DESCRIPTION OF EMBODIMENTS

Figure 1:
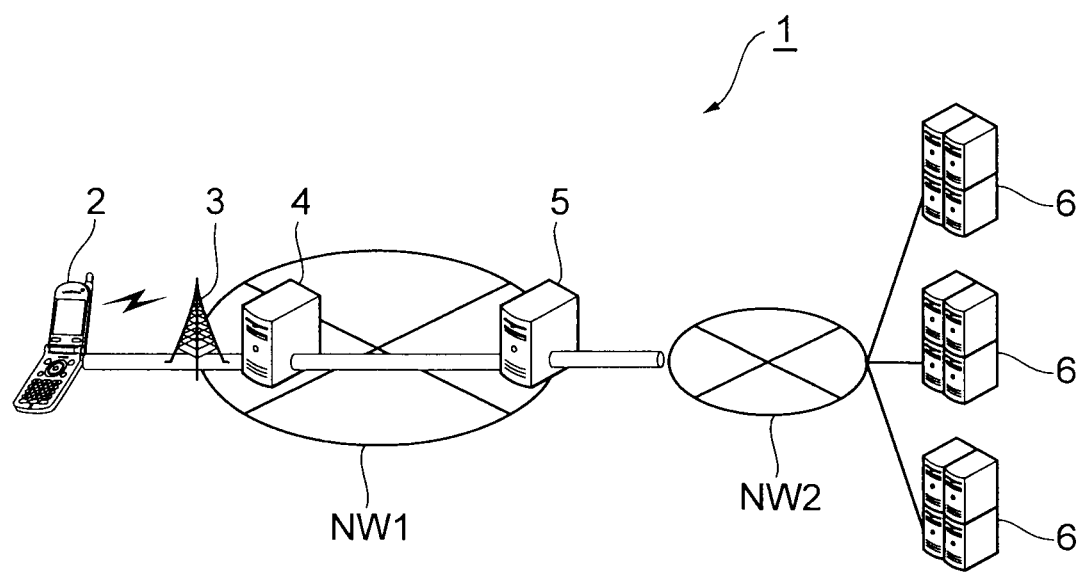
FIG. 1 is a schematic configuration diagram of a data communication system according to a first embodiment of the present invention.

Preferred embodiments of a data communication terminal, a proxy device, a data communication system, and a data communication method by the present invention will be described in detail below with the drawings. Note that in description of the drawings the same elements are denoted by the same reference numerals and overlapping description is omitted.

[First Embodiment]

FIG. 1 is a schematic configuration diagram of a data communication system 1 according to a first embodiment of the present invention. As shown in FIG. 1, the data communication system 1 according to the present embodiment is configured to include a mobile communication terminal (data communication terminal) 2 used by a user who attempts to transmit and receive data; an exchange 4 and a proxy device 5 which are provided in a mobile communication network NW1; and server devices (communication destination devices) 6 which are connected to an Internet network NW2 and managed by content providers, etc. The data communication system 1 is a communication system that implements data communication between the mobile communication terminal 2 and the server devices 6 in a data communication network including the mobile communication network NW1 and the Internet network NW2.

The mobile communication terminal 2 included in the data communication system 1 is connected to the proxy device 5 in the mobile communication network NW1 via a radio base station 3 and the exchange 4 at a transport layer protocol level, using wireless communication. Here, when the mobile communication terminal 2 communicates with the proxy device 5 at the transport layer protocol level, the mobile communication terminal 2 uses a local IP address and port number which are assigned in advance.

The proxy device 5 is allowed to be simultaneously connected to the mobile communication network NW1 and the Internet network NW2 at the transport layer protocol level, and relays data transmitted from the mobile communication terminal 2, to a server device 6 via the Internet network NW2 and relays data received from the server device 6 via the Internet network NW2 to the mobile communication terminal 2. Namely, the proxy device 5 terminates the connection with the mobile communication terminal 2 and the connection with the server device 6 at the transport layer protocol level. The proxy device 5 has a proxy function for ensuring the safety of data communication and preventing a shortage of global IP addresses. When the proxy device 5 communicates with the mobile communication terminal 2 on the side of the mobile communication network NW1, they mutually use private IP addresses and port numbers. When the proxy device 5 communicates with the server devices 6 on the side of the Internet network NW2, they mutually use global IP addresses and port numbers. Note that the proxy device 5 is set in advance such that, when the proxy device 5 directly transmits and receives control signals to/from the mobile communication terminal 2, only a specific application layer protocol such as HTTP is usable.

Figure 2:
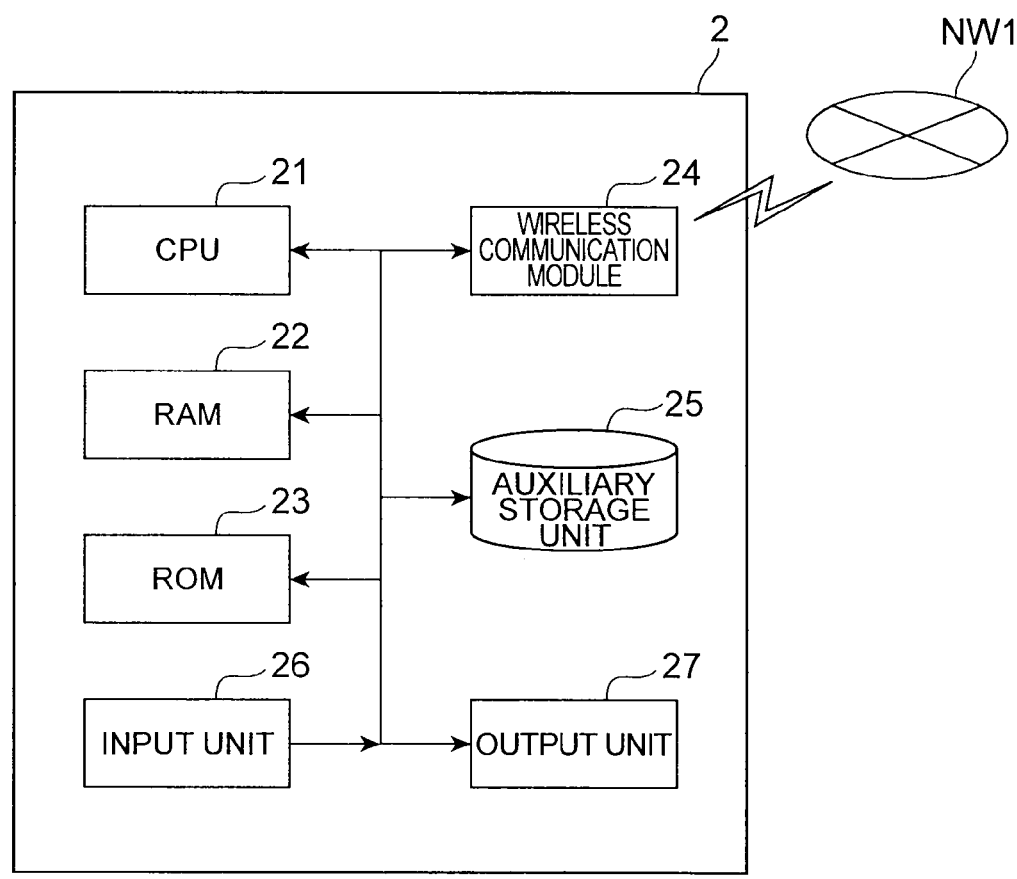
FIG. 2 is a hardware configuration diagram of a mobile communication terminal in FIG. 1.

FIG. 2 is a hardware configuration diagram of the mobile communication terminal 2. The mobile communication terminal 2 is physically configured as a terminal device that includes, as shown in the figure, a CPU 21; a RAM 22 and a ROM 23 which are main storage units; an auxiliary storage unit 25 such as a hard disk device; an input unit 26 which is an input device, such as input keys; an output unit 27 such as a display; a wireless communication module 24 including a wireless transceiver, etc.; and the like. The wireless communication module 24 is a module that performs wireless communication using a mobile communication system, and implements a data communication function with any terminal device and server device in cooperation with the CPU 21, the RAM 22, the ROM 23, etc. Each of the functions of the mobile communication terminal 2 which will be described later is implemented by loading predetermined software onto hardware such as the CPU 21 and the RAM 22 to allow the wireless communication module 24, the input unit 26, and the output unit 27 to operate under control of the CPU 21, and to perform reading and writing of data in the RAM 22 and the auxiliary storage unit 25.

Figure 3:
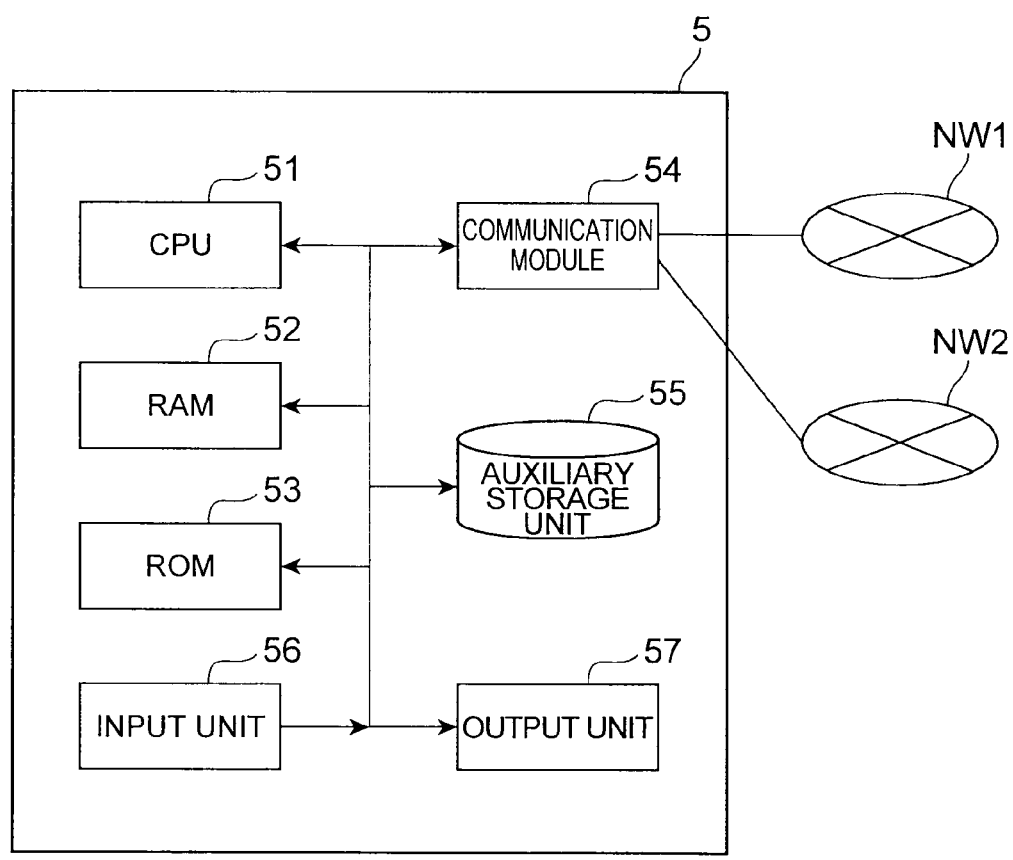
FIG. 3 is a hardware configuration diagram of a proxy device in FIG. 1.

FIG. 3 is a hardware configuration diagram of the proxy device 5. The proxy device 5 is physically configured as a server device that includes, as shown in the figure, a CPU 51; a RAM 52 and a ROM 53 which are main storage units; an auxiliary storage unit 55 such as a hard disk device; an input unit 56 which is an input device, such as input keys; an output unit 57 such as a display; a communication module 54 including a network card, etc.; and the like. The communication module 54 is a module that performs data communication with the mobile communication network NW1 and the Internet network NW2, and implements a data communication function with any terminal device and server device in cooperation with the CPU 51, the RAM 52, the ROM 53, etc. Each of the functions of the proxy device 5 which will be described later is implemented by loading predetermined software onto hardware such as the CPU 51 and the RAM 52 to allow the wireless communication module 54, the input unit 56, and the output unit 57 to operate under control of the CPU 51, and to perform reading and writing of data in the RAM 52 and the auxiliary storage unit 55.

The functional configurations of the mobile communication terminal 2 and the proxy device 5 will be described in detail below.

Figure 4:
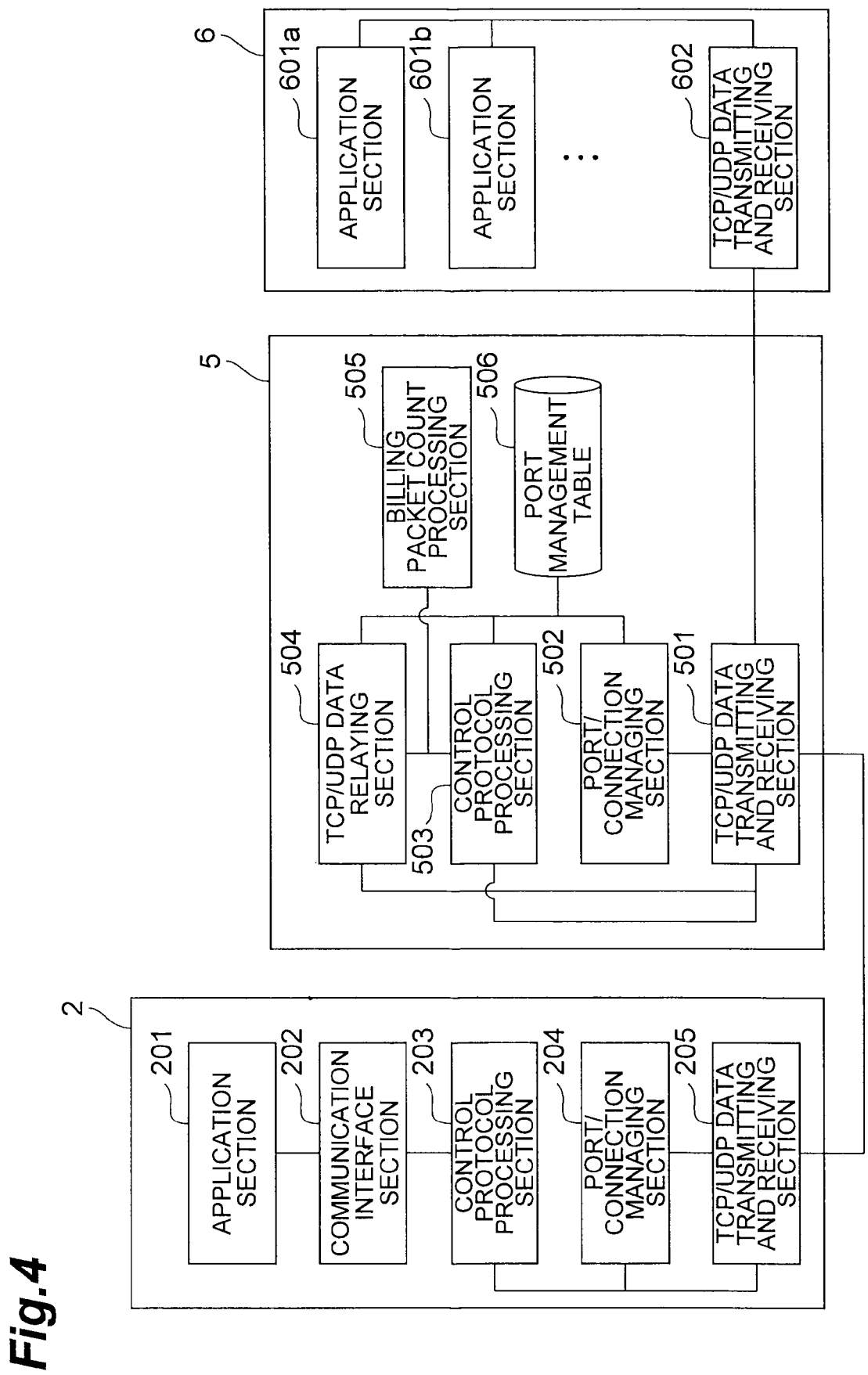
FIG. 4 is a functional block diagram showing functional configurations of the mobile communication terminal and the proxy device in FIG. 1.

As shown in FIG. 4, the mobile communication terminal 2 includes an application section (data communication means) 201, a communication interface section 202, a control protocol processing section (address getting means and connection requesting means) 203, a port/connection managing section 204, and a TCP/UDP data transmitting and receiving section (connection establishing means) 205.

The application section 201 transmits and receives data to/from the server devices 6 and other mobile communication terminals, using an application layer protocol such as HTTP, FTP, or SIP. The application section 201 corresponds, for example, to a Web browser or an IP phone application program. Furthermore, the application section 201 can also request for a connection with a server device 6 by a predetermined transport layer protocol such as TCP/IP or UDP/IP, in response to a request from a user. In that case, the application section 201 performs transmission and reception of data via the proxy device 5 over a TCP/IP or UDP/IP communication channel that connects the mobile communication terminal 2 to the server device 6, using, as a source address, a global IP address and port number which are assigned by the proxy device 5 and using any application layer protocol.

The communication interface section 202 is a portion that performs an interface function between the application section 201 and the TCP/UDP data transmitting and receiving section 205. Specifically, the communication interface section 202 adds a data header used in the transport layer protocol to data at the application layer protocol level transmitted from the application section 201 and passes the resulting data to the TCP/UDP data transmitting and receiving section 205, and extracts data at the application layer protocol level from data at the transport layer protocol level received by the TCP/UDP data transmitting and receiving section 205 and passes the extracted data to the application section 201.

The control protocol processing section 203 transmits and receives various control signals to/from the proxy device 5, using HTTP which is an application layer protocol made usable in advance with respect to the proxy device 5, when the application section 201 requests for a connection by a predetermined transport layer protocol such as TCP/IP or UDP/IP. Specifically, the control protocol processing section 203 transmits an address request signal using HTTP to the proxy device 5, gets a global IP address and port number (global address information) which are assigned by the proxy device 5 in response to the address request signal, and a connection ID and registers the gotten global IP address, port number, and connection ID in the port/connection managing section 204 and passes over the gotten global IP address, port number, and connection ID to the application section 201. The global IP address and port number are an address used when establishing a TCP/IP or UDP/IP connection with the server device 6, and are managed by the proxy device 5 in advance.

In addition, after the control protocol processing section 203 gets the global IP address and port number, the control protocol processing section 203 transmits, using HTTP, a connection request signal requesting for a TCP/IP or UDP/IP connection with the server device 6, to the proxy device 5. At this time, the control protocol processing section 203 transmits, using HTTP, a global IP address and port number (connection destination information) of the server device 6 which is a communication destination of the application section 201, to the proxy device 5. The connection destination information of the server device 6 is stored in the port/connection managing section 204 by the user inputting or selecting the information in advance.

The TCP/UDP data transmitting and receiving section 205 is a portion that terminates data communication at the TCP/IP or UDP/IP transport layer protocol level, with the proxy device 5. The TCP/UDP data transmitting and receiving section 205 also performs the process of establishing a connection for a TCP/IP or UDP/IP communication session with the proxy device 5, after the control protocol processing section 203 gets a global IP address and port number from the proxy device 5. At this time, the TCP/UDP data transmitting and receiving section 205 uses a private IP address and port number assigned in advance between the proxy device 5 and the mobile communication terminal 2. Furthermore, when data communication by the application section 201 is completed, the TCP/UDP data transmitting and receiving section 205 releases the communication session with the proxy device 5.

The proxy device 5 includes a TCP/UDP data transmitting and receiving section (connection establishing means) 501, a port/connection managing section (address assigning means) 502, a control protocol processing section 503, a TCP/UDP data relaying section (data transferring means) 504, a billing packet count processing section 505, and a port management table (routing information storage means) 506.

The TCP/UDP data transmitting and receiving section 501 terminates data communication at the TCP/IP or UDP/IP transport layer protocol level, with both the mobile communication terminal 2 and the server device 6. In addition, when the TCP/UDP data transmitting and receiving section 501 receives a connection request signal including connection destination information of the server device 6 from the mobile communication terminal 2, the TCP/UDP data transmitting and receiving section 501 establishes a connection for a TCP/IP or UDP/IP communication session with the server device 6. At this time, the TCP/UDP data transmitting and receiving section 501 uses, for communication with the mobile communication terminal 2, a private IP address and port number which are assigned in advance, and uses, for communication with the server device 6, a global IP address and port number which are assigned to the mobile communication terminal 2 by the port/connection managing section 502. Furthermore, when a communication session is released by the mobile communication terminal 2, the TCP/UDP data transmitting and receiving section 205 releases the communication session with the server device 6.

The port/connection managing section 502 assigns a global IP address and port number to the mobile communication terminal 2 when receiving an address request signal requesting for global address information from the mobile communication terminal 2, and returns the assigned global IP address and port number to the mobile communication terminal 2 via the control protocol processing section 503. At this time, the port/connection managing section 502 allocates a connection ID for managing the assigned global IP address and port number in an association manner, and returns the connection ID to the mobile communication terminal 2 and stores the global IP address and port number and the connection ID in the port management table 506 in an association manner.

FIG. 5 shows routing table information stored in the port management table 506 in the above-described manner. As shown in the figure, the local (private) IP address "10.XXX.XX.1" and the local (private) port number "1100" which correspond to a connection destination communication port on the side of the mobile communication terminal 2, the used protocol "TCP", the assigned global IP address "15.XXX.XX.1", and the assigned port number "2004" are stored to be associated with the connection ID "25". By this routing table information, a communication session at the transport layer level between the mobile communication terminal 2 and the server device 6 is managed. The "own node port on the mobile device side" in the routing table information indicates a port number corresponding to a communication port of the proxy device 5 that is connected to the mobile communication terminal 2, the "own node port on the server side" indicates a port number corresponding to a communication port that is connected to the server device 6, and the "connection destination IP address" and the "connection destination port" indicate connection destination information of the server device 6 notified from the mobile communication terminal 2.

Referring back to FIG. 4, the control protocol processing section 503 transmits and receives various control signals by HTTP to/from the mobile communication terminal 2 via the TCP/UDP data transmitting and receiving section 501. Specifically, when an address request signal is received from the mobile communication terminal 2, the control protocol processing section 503 notifies the port/connection managing section 502 of the address request signal, and returns a response signal including a global IP address, a port number, and a connection ID which are assigned by the port/connection managing section 502 in response to the address request signal, to the mobile communication terminal 2. In addition, when the control protocol processing section 503 receives a connection request signal including connection destination information of the server device 6 from the mobile communication terminal 2, the control protocol processing section 503 notifies the TCP/UDP data transmitting and receiving section 501 of the connection request signal. When, in response to the connection request signal, a communication session with the server device 6 is established by the TCP/UDP data transmitting and receiving section 501, the control protocol processing section 503 returns a response signal to the mobile communication terminal 2.

The TCP/UDP data relaying section 504 relays data to be transmitted and received between the mobile communication terminal 2 and the server device 6, at the transport layer protocol level after a TCP/IP communication session or a UDP/IP communication session with the server device 6 is established by the TCP/UDP data transmitting and receiving section 501. Specifically, the TCP/UDP data relaying section 504 sets a source address in a TCP header or a UDP header of data received from the mobile communication terminal 2 by replacing the source address with the global address information which is assigned to the mobile communication terminal 2, and transfers the data to the server device 6 using a communication channel that connects the proxy device 5 to the server device 6.

FIG. 6 shows schematic configurations of data at the transport layer protocol level which is transferred by the TCP/UDP data relaying section 504. As shown in the figure, the TCP/UDP data relaying section 504 receives data whose destination IP and destination port are set to a local IP address and a local port number of the proxy device 5, from a communication port to which a source IP and a source port on the side of the mobile communication terminal 2 are assigned (FIG. 6(*a*)). Then, the TCP/UDP data relaying section 504 extracts, by referring to the routing table information stored in the port management table 506, a record of the routing table information that matches a source IP and a source port in a header of the received data. The TCP/UDP data relaying section 504 then reads a connection destination IP address and a connection destination port (see FIG. 5) in the extracted record and embeds the connection destination IP address and the connection destination port in the destination IP and the destination port in the data received from the mobile communication terminal 2. The TCP/UDP data relaying section 504 further replaces the source IP and the source port in the data in which the connection destination IP address and the connection destination port are embedded, with a global IP address and a global port number which are assigned to the mobile communication terminal 2 (FIG. 6(b)). Then, the TCP/UDP data relaying section 504 outputs the data whose header portion is thus transformed, to a communication port that is connected on the side of the server device 6 as one for data communication of the mobile communication terminal 2, via the TCP/UDP data transmitting and receiving section 501 and thereby transfers the data to the server device 6.

Likewise, when the TCP/UDP data relaying section 504 receives data destined for a global IP address and a global port number which are assigned to the mobile communication terminal 2 from the server device 6, the TCP/UDP data relaying section 504 transforms a header portion of the data and transfers the data through a local communication port on the side of the mobile communication terminal 2.

Referring back to FIG. 4, the billing packet count processing section 505 monitors control signals transmitted and received from/by the control protocol processing section 503 and data relayed by the TCP/UDP data relaying section 504, to count the amount of such data and performs an adding-up process and a charging data generation process for billing targeted for the mobile communication terminal 2.

The server device 6 is configured to include application sections 601a and 601b and a TCP/UDP data transmitting and receiving section 602. The application sections 601a and 601b are a Web server program, a data processing program, etc., and transmit and receive data to/from the mobile communication terminal 2, using an application layer protocol. The TCP/UDP data transmitting and receiving section 602 is a portion that terminates data communication at the TCP/IP or UDP/IP transport layer protocol level, with the proxy device 5.

Figure 7:
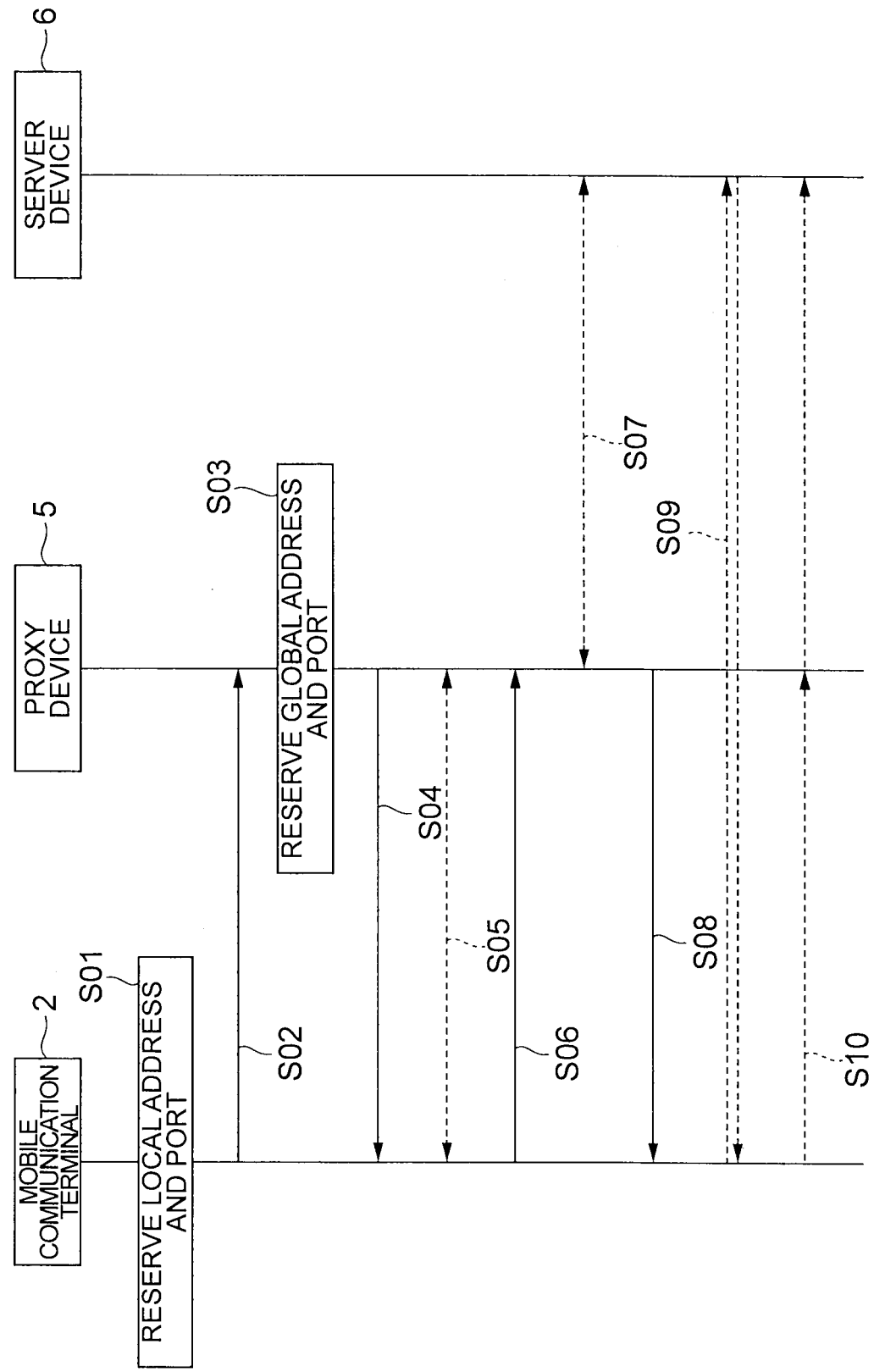
FIG. 7 is a sequence diagram showing the operation of the data communication system in FIG. 1.
Figure 8:
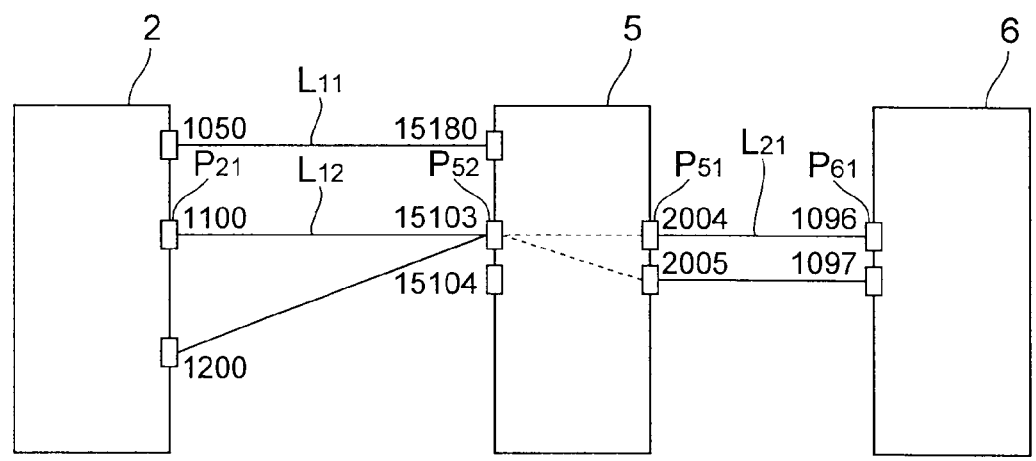
FIG. 8 is a diagram showing an image of communication channels which are connected in the data communication system according to the operation in FIG. 7.

Next, with reference to FIGS. 7 and 8, the operation of the data communication system 1 will be described, together with which a data communication method performed by the data communication system 1 will be described in detail. FIG. 7 is a sequence diagram showing the operation of the data communication system 1 and FIG. 8 is a diagram showing an image of communication channels which are connected in the data communication system 1 according to the operation in FIG. 7.

First, when the application section 201 of the mobile communication terminal 2 requests for a TCP/IP or UDP/IP connection with the server device 6, the port/connection managing section 204 reserves a local communication port $P_{21}$ of the mobile communication terminal 2 for a connection with the proxy device 5 (step S01). Then, the control protocol processing section 203 transmits an address request to the proxy device 5 via a communication channel $L_{11}$ where HTTP is set to be usable in advance between the mobile communication terminal 2 and the proxy device 5 (step S02).

In response to this, the port/connection managing section 502 of the proxy device 5 assigns a global IP address, port number and a connection ID for the mobile communication terminal 2 and adds a record to the routing table information in the port management table 506. At the same time, a global communication port $P_{51}$ for a connection with a server device 6 having the assigned global IP address and port number is reserved (step S03). When the global communication port $P_{51}$ is reserved, the control protocol processing section 503 transmits a response signal to the mobile communication terminal 2 (step S04).

Thereafter, the TCP/UDP data transmitting and receiving section 205 of the mobile communication terminal 2 establishes a communication channel $L_{12}$ by TCP/IP communication or UDP/IP communication, between the local communication port $P_{21}$ and a local communication port $P_{52}$ which is set in advance in the proxy device 5 (step S05). Here, in the case of UDP/IP communication, the logical communication channel $L_{12}$, i.e., a virtual path, is established. Furthermore, the control protocol processing section 203 transmits to the proxy device 5 a connection request signal including connection destination information of the server device 6, using HTTP (step S06).

In response to this, the TCP/UDP data transmitting and receiving section 501 of the proxy device 5 establishes a communication channel $L_{21}$ by TCP/IP communication or UDP/IP communication, between the global communication port $P_{51}$ and a global communication port $P_{61}$ of the server device 6 for a connection with the proxy device 5 (step S07). Likewise, in the case of UDP/IP communication, the communication channel $L_{12}$ is a logical communication channel. When the communication channel $L_{21}$ is established, the TCP/UDP data transmitting and receiving section 501 of the proxy device 5 returns a response signal to the mobile communication terminal 2 (step S08).

Thereafter, the TCP/UDP data relaying section 504 of the proxy device 5 relays data transmitted and received between the application section 201 of the mobile communication terminal 2 and the application sections 601a and 601b of the server device 6, while referring to the routing table information (step S09). Furthermore, when the application section 201 of the mobile communication terminal 2 requests to terminate the data communication, the communication channels $L_{12}$ and $L_{21}$ are released and a corresponding record is deleted from the routing table information in the proxy device 5 (step S10).

Figure 9:
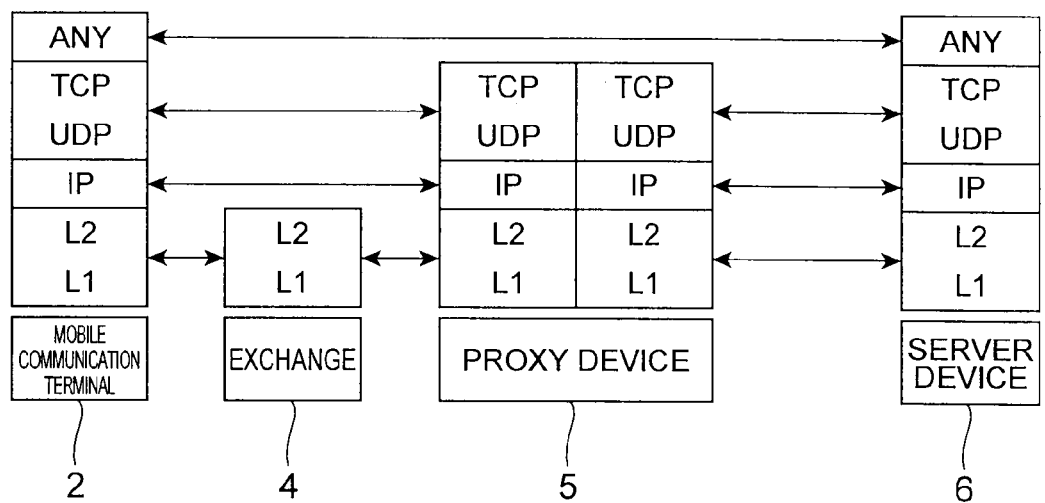
FIG. 9 is a diagram showing protocol stacks in the data communication system in FIG. 1.

According to the above-described data communication system 1 and data communication method using the data communication system 1, the mobile communication terminal 2 gets global address information from the proxy device 5 using HTTP which is an application layer protocol made usable in advance, and the mobile communication terminal 2 and the proxy device 5 are connected by a predetermined transport layer protocol such as TCP or UDP. Then, the mobile communication terminal 2 passes connection destination information of the server device 6 to the proxy device 5 using HTTP, and the proxy device 5 and the server device 6 are connected by a predetermined transport layer protocol (FIG. 9). Data transmitted from the mobile communication terminal 2 to the proxy device 5 is transmitted to the server device 6 via the proxy device 5 such that the global address information assigned to the mobile communication terminal 2 is set as a source.

By this, even if an application layer protocol made usable in advance in a data communication network is limited, data transfer using any application layer protocol is easily implemented via the proxy device 5. Namely, unlike simple NAT technology, since an application program on the side of the mobile communication terminal 2 can obtain global address information which is assigned to the mobile communication terminal 2 in a network outside the proxy device 5, any application program can perform data communication on a predetermined transport layer protocol. For example, even if the protocol is one (SIP, etc.) that operates such that an IP address is embedded in data of an application layer, by obtaining and embedding this global IP address, the protocol can operate normally.

Furthermore, since the existing proxy function is also maintained and data is exchanged through the proxy function, the safety of data communication in the terminal can be maintained. In addition, while data communication on any application layer protocol using TCP or UDP is enabled, global IP addresses assigned to the mobile communication terminal 2 can be conserved.

[Second Embodiment]

Figure 10:
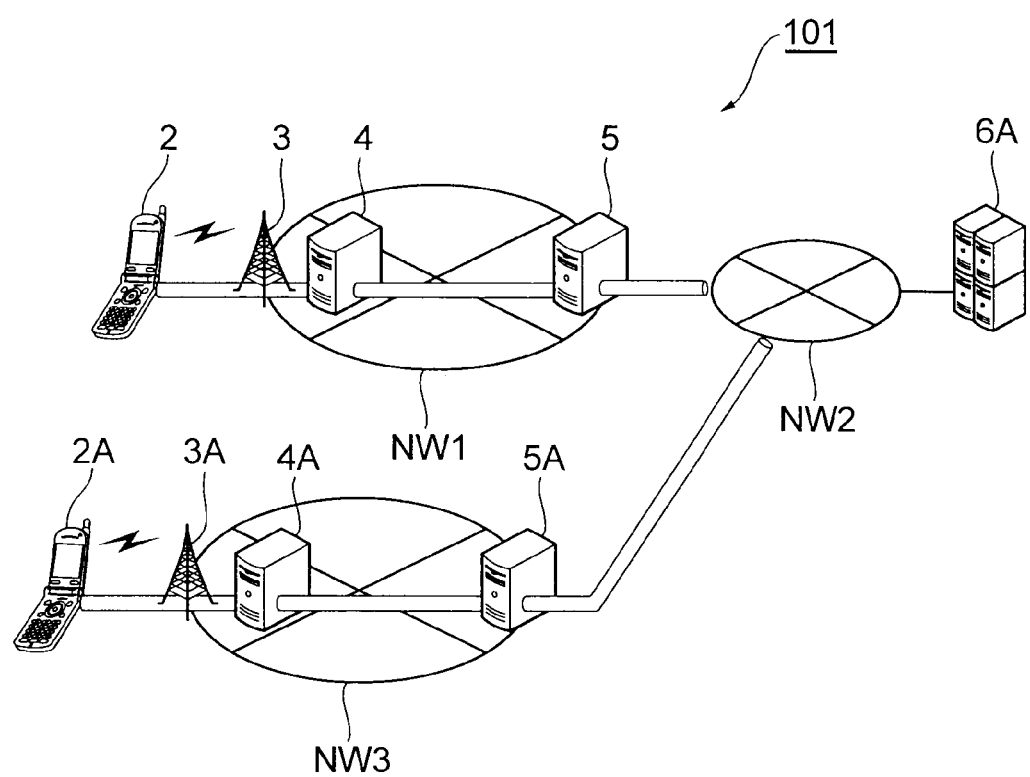
FIG. 10 is a schematic configuration diagram of a data communication system according to a second embodiment of the present invention.

FIG. 10 is a schematic configuration diagram of a data communication system 101 according to a second embodiment of the present invention. As shown in the figure, in the data communication system 101 according to the present embodiment, separately from a mobile communication terminal 2, a mobile communication terminal 2A serving as a connection partner of the mobile communication terminal 2 in data communication is provided to be connectable to a mobile communication network NW3, and a radio base station 3A, an exchange 4A, and a proxy device 5A are provided in the mobile communication network NW3. Furthermore, a matching server device 6A for address information exchange which is managed by a content provider, etc., is connected to an Internet network NW2.

The mobile communication terminal 2A has the same functions as the mobile communication terminal 2, and is allowed to be connected to the proxy device 5A via the radio base station 3A and the exchange 4A at the transport layer protocol level. The proxy device 5A has the same functions as a proxy device 5, and is allowed to be simultaneously connected to the mobile communication network NW3 and the Internet network NW2 at the transport layer protocol level.

Figure 11:
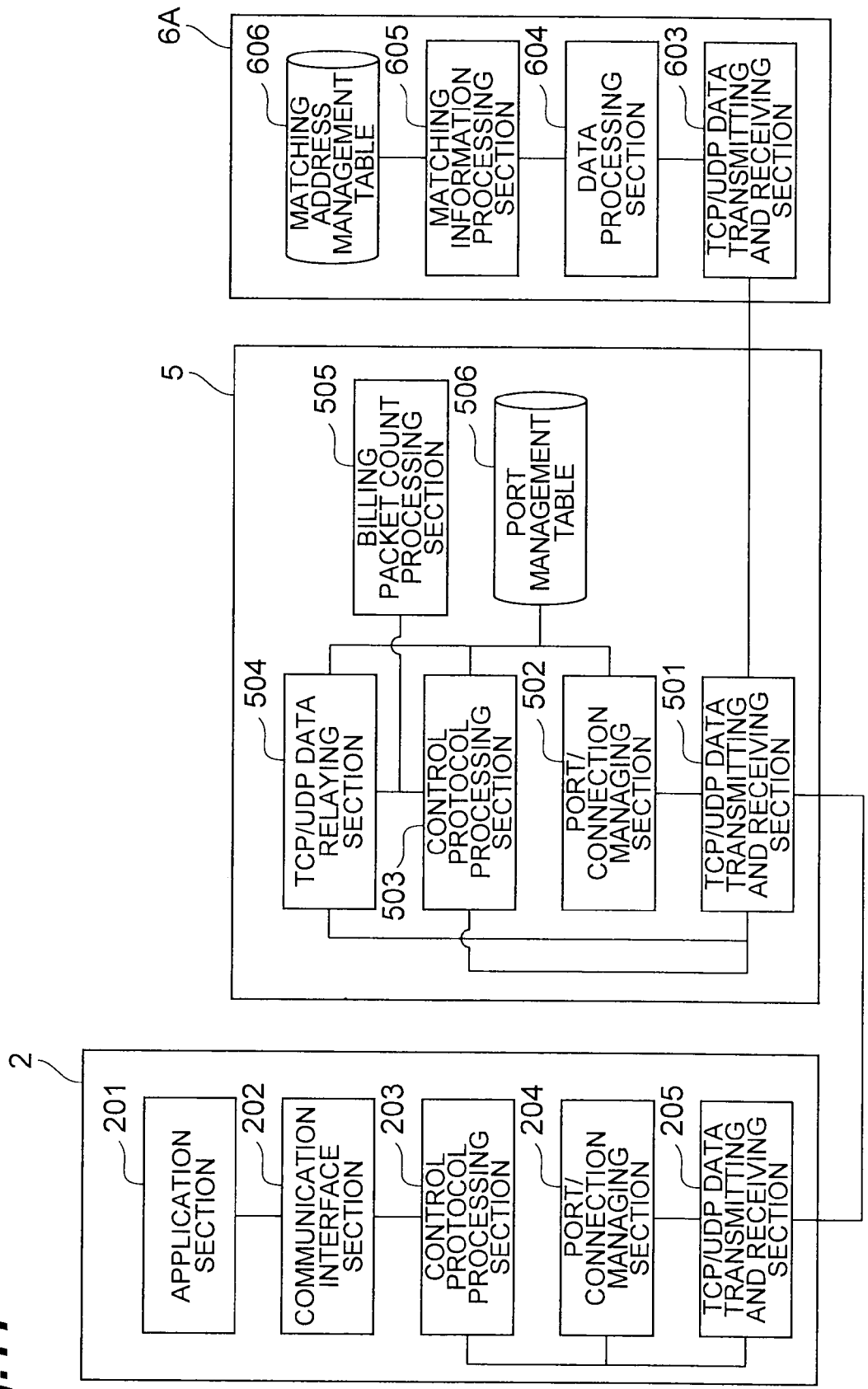
FIG. 11 is a functional block diagram showing functional configurations of a mobile communication terminal and a proxy device in FIG. 10.

FIG. 11 is a block diagram showing a functional configuration of the data communication system 101. The functional configurations of the mobile communication terminal 2 and the proxy device 5 are the same as those in the first embodiment.

As shown in the figure, the matching server device 6A includes a TCP/UDP data transmitting and receiving section 603, a data processing section 604, a matching information processing section 605, and a matching address management table 606. The TCP/UDP data transmitting and receiving section 603 is a portion that terminates data communication at the transport layer protocol level, with the proxy devices 5 and 5A. The data processing section 604 extracts data at the application layer protocol level from data transmitted from the proxy devices 5 and 5A via the TCP/UDP data transmitting and receiving section 603, and outputs data at the application layer protocol level to be transmitted to the proxy devices 5 and 5A, to the TCP/UDP data transmitting and receiving section 603 and thereby transmits the data to the proxy devices 5 and 5A.

The matching information processing section 605 transmits and receives global address information such as global IP addresses and port numbers which are assigned to the mobile communication terminals 2 and 2A, using an application layer protocol, such as HTTP, which is made usable in advance between the mobile communication terminals 2 and 2A and the matching server device 6A. Specifically, while the matching information processing section 605 stores in the matching address management table 606 pieces of global address information which are received from the mobile communication terminals 2 and 2A via the TCP/UDP data transmitting and receiving section 603 and the data processing section 604, the matching information processing section 605 transmits pieces of each other's global address information which have a match in terms of a communication partner and which are read from the matching address management table 606, to the mobile communication terminals 2 and 2A via the data processing section 604 and the TCP/UDP data transmitting and receiving section 603. FIG. 12 shows data configuration of global address information stored in the matching address management table 606 in the above-described manner. As shown in the figure, the IP address "15.XXX.XX.1" and the port number "2004" which are global address information received from the mobile communication terminal 2 are stored to be associated with the ID "1" which identifies the mobile communication terminal 2 and the ID "2" which identifies the connection partner of the mobile communication terminal 2.

Figure 13:
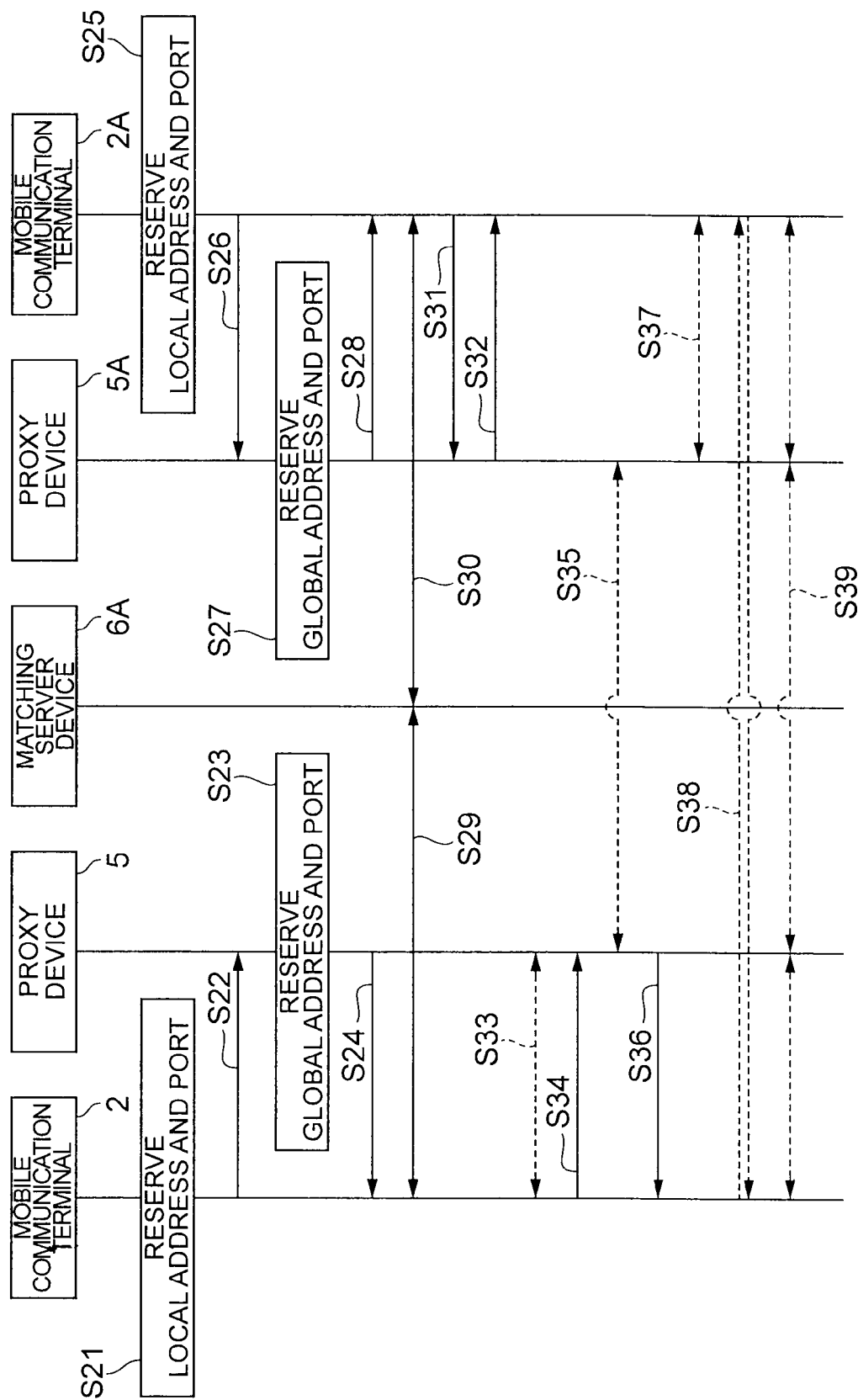
FIG. 13 is a sequence diagram showing the operation of the data communication system in FIG. 10.
Figure 14:
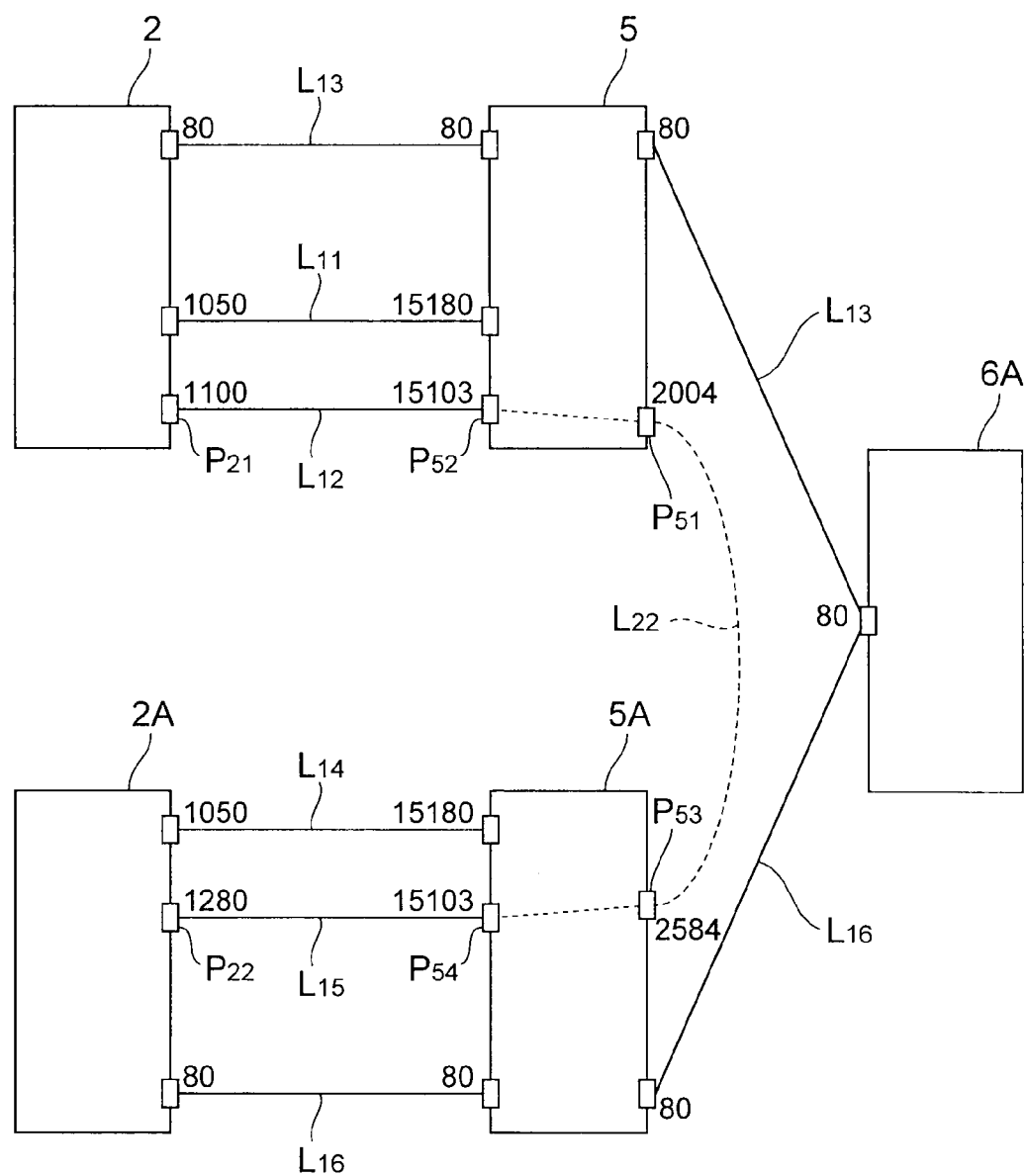
FIG. 14 is a diagram showing an image of communication channels which are connected in the data communication system according to the operation in FIG. 13.

With reference to FIGS. 13 and 14, the operation of the data communication system 101 will be described below. FIG. 13 is a sequence diagram showing the operation of the data communication system 101 and FIG. 14 is a diagram showing an image of communication channels which are connected in the data communication system 1 according to the operation in FIG. 13.

First, when TCP/IP or UDP/IP data communication with the mobile communication terminal 2A starts, the mobile communication terminal 2 which functions as a client gets a global IP address and a global port number from the proxy device 5 by performing the same operations as those at steps S01 to S04 described with reference to FIG. 7 (steps S21 to S24). In parallel with this, the mobile communication terminal 2A which functions as a server when connected to the mobile communication terminal 2 gets a global IP address and a global port number from the proxy device 5A (steps S25 to S28).

Thereafter, the global IP address and the global port number which are gotten by the mobile communication terminal 2 are transmitted to the matching server device 6A from the mobile communication terminal 2 via an HTTP communication channel $L_{13}$ which is established in advance between the mobile communication terminal 2 and the matching server device 6A, and are registered in the matching address management table 606. At the same time, the mobile communication terminal 2 receives the global IP address and global port number of the mobile communication terminal 2A which is a communication destination device from the matching server device 6A (step S29). On the other hand, the global IP address and the global port number which are gotten by the mobile communication terminal 2A are transmitted to the matching server device 6A from the mobile communication terminal 2A via an HTTP communication channel $L_{16}$ which is established in advance between the mobile communication terminal 2A and the matching server device 6A, and are registered in the matching address management table 606. At the same time, the mobile communication terminal 2A receives the global IP address and global port number of the mobile communication terminal 2 which is a communication destination device from the matching server device 6A (step S30).

Then, the mobile communication terminal 2A transmits a TCP/IP or UDP/IP communication session establishment wait request signal to the proxy device 5A (step S31). The establishment wait request signal includes the global address information of the mobile communication terminal 2. The proxy device 5A having received the signal transitions to a state of waiting for the establishment of a communication session with the mobile communication terminal 2 (step S32).

Thereafter, the mobile communication terminal 2 establishes a communication channel $L_{12}$ by TCP/IP communication or UDP/IP communication, between a local communication port $P_{21}$ and a local communication port $P_{52}$ of the proxy device 5 (step S33). Note that in the case of UDP/IP communication the communication channel $L_{12}$ is a logical communication channel. Furthermore, the mobile communication terminal 2 transmits a connection request signal including the global address information of the mobile communication terminal 2A to the proxy device 5, using HTTP (step S34).

In response to this, the proxy device 5 establishes a communication channel $L_{22}$ by TCP/IP communication or UDP/IP communication, between a global communication port $P_{51}$ and a global communication port $P_{53}$ of the proxy device 5A corresponding to the global address information (step S35). When the communication channel $L_{22}$ is established, the proxy device 5 returns a response signal to the mobile communication terminal 2 (step S36), and at the same time, a communication channel $L_{15}$ by TCP/IP communication or UDP/IP communication is established between a local communication port $P_{54}$ of the proxy device 5A and a local communication port $P_{22}$ of the mobile communication terminal 2A (step S37). Likewise, in the case of UDP/IP communication, the communication channels $L_{22}$ and $L_{15}$ are logical communication channels.

Thereafter, data to be transmitted and received between the mobile communication terminal 2 and the mobile communication terminal 2A is relayed by the proxy device 5 and the proxy device 5A (step S38). Furthermore, when either the mobile communication terminal 2 or the mobile communication terminal 2A requests to terminate the data communication, the communication channels $L_{12}$, $L_{22}$, and $L_{15}$ are released and corresponding records are deleted from the routing table information in the proxy devices 5 and 5A (step S39).

According to the above-described data communication system 101 and data communication method, a connection can be established at the level of a predetermined transport layer protocol via a plurality of proxy devices. In addition, the mobile communication terminals 2 and 2A can easily establish a connection with their communication destinations using any application layer protocol. Specifically, even if addresses assigned to the mobile communication terminals 2 and 2A are, for example, local IP addresses, since the application layer can obtain global IP addresses from the proxy devices 5 and 5A, as with when global IP addresses are assigned to the mobile communication terminals 2 and 2A in advance, any application layer protocol can be used. Furthermore, by the proxy devices 5 and 5A working in cooperation with each other, even when an IP address of an end node is changed and when trouble occurs in a proxy device, an end-to-end communication session can be easily maintained.

It is preferred that the above-described data communication terminal further include address exchanging means for transmitting global address information gotten by the data address getting means to the data communication network and receiving global address information of a communication destination device, and the connection requesting means transmit the global address information of the communication destination device received by the address exchanging means to the proxy device.

By adopting such a configuration, the data communication terminal can easily establish a connection with its communication destination, using any application layer protocol. Specifically, even if an address assigned to the data communication terminal is, for example, a local IP address, since the application layer can obtain a global IP address from the proxy device, as with when a global IP address is assigned to the data communication terminal in advance, any application layer protocol can be used.

It is preferred that the above-described proxy device further include routing information storage means for storing a piece of information on a first communication port which is a connection destination on the data communication terminal side and a piece of information on a second communication port connected to a communication destination device by a predetermined transport layer protocol such that the pieces of information are associated with connection destination information of the communication destination device, and the data transferring means output data received from the first communication port to the second communication port by referring to the routing information storage means, and thereby transmit the data to the communication destination device.

In this case, by the proxy device transmitting data while referring to the routing information storage means, data sent out from the first communication port on the data communication terminal side is turned out to be relayed to the second communication port and thus the data can be reliably transmitted to the communication destination device.

INDUSTRIAL APPLICABILITY

Applications of the present invention include data communication terminals, proxy devices, data communication systems, and data communication methods, and the present invention allows to easily implement data communication where an application layer protocol used upon data communication is not limited, while a proxy function is maintained.

REFERENCE SIGNS LIST 1 and 101: DATA COMMUNICATION SYSTEM, 2 and 2A: MOBILE COMMUNICATION TERMINAL, 5 and 5A: PROXY DEVICE, 6: SERVER DEVICE (COMMUNICATION DESTINATION DEVICE), 6A: MATCHING SERVER DEVICE, 201: APPLICATION SECTION (DATA COMMUNICATION MEANS), 203: CONTROL PROTOCOL PROCESSING SECTION (ADDRESS GETTING MEANS, CONNECTION REQUESTING MEANS, and ADDRESS EXCHANGING MEANS), 205: TCP/UDP DATA TRANSMITTING AND RECEIVING SECTION (CONNECTION ESTABLISHING MEANS), 501: TCP/UDP DATA TRANSMITTING AND RECEIVING SECTION (CONNECTION ESTABLISHING MEANS), 502: PORT/CONNECTION MANAGING SECTION (ADDRESS ASSIGNING MEANS), 504: TCP/UDP DATA RELAYING SECTION (DATA TRANSFERRING MEANS), 506: PORT MANAGEMENT TABLE (ROUTING INFORMATION STORAGE MEANS), NW1 and NW3: MOBILE COMMUNICATION NETWORK (DATA COMMUNICATION NETWORK), and NW2: INTERNET NETWORK (DATA COMMUNICATION NETWORK).

The invention claimed is:

1. A data communication terminal that performs data communication with a communication destination device through a proxy device in a data communication network, using a predetermined transport layer protocol, the data communication terminal comprising:
  circuitry configured to:
    transmit an address request to the proxy device using an application layer protocol, to get global address information which is used when establishing a connection with the communication destination device by the predetermined transport layer protocol, the application layer protocol being set to be usable in advance between the proxy device and the data communication terminal;

establish a connection with the proxy device by the predetermined transport layer protocol;

transmit connection destination information of the communication destination device to the proxy device using the application layer protocol, to request for a connection by the predetermined transport layer protocol between the proxy device and the communication destination device; and transmit data over a communication channel connected by establishment of the connection with the proxy device by the predetermined transport layer protocol and connection by the predetermined transport layer protocol between the proxy device and the communication destination device by embedding the global address information, as a source address, in the data of the application layer when using Session Initiation Protocol (SIP).

2. The data communication terminal according to claim 1, wherein the circuitry is configured to transmit the global address information to the data communication network, and receive global address information of the communication destination device, wherein the circuitry transmits the global address information of the communication destination device to the proxy device.

3. A proxy device that is set up in a data communication network and relays data communication between a data communication terminal and a communication destination device using a predetermined transport layer protocol, the proxy device comprising:

circuitry configured to:

receive an address request using an application layer protocol from the data communication terminal, and assign global address information to the data communication terminal and transmit the global address information to the data communication terminal, the application layer protocol being set to be usable in advance between the data communication terminal and the proxy device and the global address information being used when establishing a connection with the communication destination device by the predetermined transport layer protocol;

receive connection destination information of the communication destination device from the data communication terminal using the application layer protocol, and establish a connection with the communication destination device by the predetermined transport layer protocol; and set the global address information as a source and thereafter transfer data received from the data communication terminal on the predetermined transport layer protocol to the communication destination device, using a communication channel connected by establishing the connection with the communication destination device by the predetermined transport layer protocol, wherein the global address information is embedded, as a source address, in the data of the application layer when using Session Initiation Protocol (SIP).

4. The proxy device according to claim 3, further comprising:

a routing information storage device that stores a piece of information on a first communication port which is a connection destination on a side of the data communication terminal and a piece of information on a second communication port connected to the communication destination device by the predetermined transport layer protocol such that the pieces of information are associated with the connection destination information of the communication destination device, wherein the circuitry outputs the data received from the first communication port to the second communication port by referring to the routing information storage device, and thereby transmits the data to the communication destination device.

5. A data communication system comprising:

a data communication terminal that performs data communication with a communication destination device through a proxy device in a data communication network, using a predetermined transport layer protocol, the data communication terminal comprising circuitry configured to:

transmit an address request to the proxy device using an application layer protocol, to get global address information which is used when establishing a connection with the communication destination device by the predetermined transport layer protocol, the application layer protocol being set to be usable in advance between the proxy device and the data communication terminal;

establish a connection with the proxy device by the predetermined transport layer protocol;

transmit connection destination information of the communication destination device to the proxy device using the application layer protocol, to request for a connection by the predetermined transport layer protocol between the proxy device and the communication destination device; and transmit data over a communication channel connected by establishment of the connection with the proxy device by the predetermined transport layer protocol and connection by the predetermined transport layer protocol between the proxy device and the communication destination device, by embedding the global address information, as a source address, in the data of the application layer when using Session Initiation Protocol (SIP); and a proxy device that is set up in the data communication network and relays data communication between the data communication terminal and a communication destination device using the predetermined transport layer protocol, the proxy device comprising:

circuitry configured to:

receive an address request using an application layer protocol from the data communication terminal, and assign global address information to the data communication terminal and transmit the global address information to the data communication terminal, the application layer protocol being set to be usable in advance between the data communication terminal and the proxy device and the global address information being used when establishing a connection with the communication destination device by the predetermined transport layer protocol;

receive connection destination information of the communication destination device from the data communication terminal using the application layer protocol, and establish a connection with the communication destination device by the predetermined transport layer protocol; and set the global address information as a source and thereafter transfer data received from the data communication terminal on the predetermined transport layer protocol to the communication destination device, using a communication channel connected by establishing the connection with the communication destination device by the predetermined transport layer protocol.

6. A data communication method for performing data communication from a data communication terminal to a communication destination device via a proxy device in a data communication network, using a predetermined transport layer protocol, the method comprising:

an address getting step of transmitting, by the data communication terminal, an address request to the proxy device using an application layer protocol, to get from the proxy device global address information which is used when establishing a connection with the communication destination device by the predetermined transport layer protocol, the application layer protocol being set to be usable in advance between the proxy device and the data communication terminal;

a first connection establishing step of establishing, by the data communication terminal, a connection with the proxy device by the predetermined transport layer protocol;

a second connection establishing step of receiving, by the proxy device, connection destination information of the communication destination device from the data communication terminal and establishing a connection with the communication destination device by the predetermined transport layer protocol;

a data communication step of transmitting, by the data communication terminal, data over a communication channel connected in the first connection establishing step, via the proxy device by embedding the global address information, as a source address, in the data of the application layer when using Session Initiation Protocol (SIP); and a data transferring step of setting, by the proxy device, the global address information as a source and thereafter transferring the data received from the data communication terminal in the data communication step to the communication destination device, using a communication channel connected in the second connection establishing step.

* * * * *